United States Patent [19]

Royset

[11] 4,423,697
[45] Jan. 3, 1984

[54] DEVICE FOR LOCKING CHAIN, WIRE, CABLE, OR THE LIKE TO A STATIONARY STRUCTURE, PARTICULARLY A BOAT DECK

[75] Inventor: Norvald Royset, Hareid, Norway

[73] Assignee: Ulstein Trading Ltd. A/S, Ulsteinvik, Norway

[21] Appl. No.: 265,285

[22] Filed: May 20, 1981

[30] Foreign Application Priority Data

Jun. 12, 1980 [NO] Norway .................................. 801747

[51] Int. Cl.³ .............................................. B63B 21/08
[52] U.S. Cl. .................................... 114/199; 114/293; 114/218
[58] Field of Search ....................... 254/245, 251–255; 188/65.1–65.5, 67; 114/199, 200, 218, 230, 293

[56] References Cited

U.S. PATENT DOCUMENTS

| | | | |
|---|---|---|---|
| 2,148,284 | 2/1939 | White | 114/199 |
| 3,638,599 | 2/1972 | Nilsen | 114/200 |
| 3,771,488 | 11/1973 | Ecke | 114/218 |
| 4,093,042 | 6/1978 | Pradon | 188/67 |
| 4,278,041 | 7/1981 | Williams | 114/218 |

Primary Examiner—Trygve M. Blix
Assistant Examiner—Thomas J. Brahan
Attorney, Agent, or Firm—Ladas & Parry

[57] ABSTRACT

A fluid activated cable locking device for cable, chain, wire, tow etc. particularly for securing an anchor chain, pendant wire or the like on board a marine vessel, comprising a preferably cylindrical housing, in which housing a preferably hydraulic jack is arranged substantially axially, said jack having a cylinder rigidly connected with the housing, and a piston rod connected with a jaw means having a pair of locking jaws that are moved towards/from one another by extracting/withdrawing the piston rod from/into the jack cylinder. The housing with the jaw means and the jack is mounted vertically displaceable in a correspondingly shaped cylindrical well, such as in a vessel deck structure. The vertical displacing movement is carried out by means of additional jack means connected between the jaw housing and the deck structure so the locking jaw means can be stored under the deck lever when not in use.

7 Claims, 6 Drawing Figures

DEVICE FOR LOCKING CHAIN, WIRE, CABLE, OR THE LIKE TO A STATIONARY STRUCTURE, PARTICULARLY A BOAT DECK

FIELD OF THE INVENTION

This invention relates to a cable locking device for locking a cable, chain, wire or tow particularly but not exclusively for securing an anchor chain or/and pendant wire to an offshore vessel.

The device is particularly suited for use in securing a wire when shackling off and on the buoy from/on the pendant wire of an anchor chain. Here cable shall also mean chain, wire, tow or the like.

PRIOR ARTS

It is already known that e.g. schackling off the buoy on board a service boat upon the buoy has been winched on board can be a rather dangerous operation. The wire must be locked in some way when the buoy wire is schackled off. Usually, a so-called pelican hook has been used to this purpose, said hook being operated manually.

SUMMARY OF THE INVENTION

The purpose of this invention is to provide a device for quick and safe locking a chain, wire, or the like on board in a marine vessel. Nevertheless, it should be clear that the device can also be used on an off-shore platform structure, or an on-shore plant.

The device according to one aspect of the invention comprises an oblong lock housing in which there is arranged a fluid activated jack means, the jack cylinder being rigidly connected with the housing and the jack piston being operationally connected with a locking jaw means having a pair of locking jaws adapted for moving against/from one another by retracting/extending the piston rod into/from the jack cylinder, respectively, the housing being adapted to be arranged extendable/retractable in a correspondingly shaped well in a stationary structure.

In the lock jaw housing there are arranged two radial guide ribs extending in the longitudinal direction of the lock housing and projecting inwardly from the housing wall, the end portions of ribs on the jaw side being shaped as cams which when the piston rod is retracted force the jaws inwardly towards one another for arresting a cable, chain, wire, or the like which is positioned between the jaws. The housing is substantially cylindrical and the fluid jack is arranged axially in the housing. The axis of the housing is extending substantially vertical and the stationary structure is a ship deck structure. The jaws are preferably pivotably secured between guide plates having means forcing the jaws to move from one another when the jack piston rod is extended.

For lifting the device over the deck level two lifting fluid activated jacks can be arranged one on either side of the jaw jack means, the cylinders of the lifting jacks being connected with the lock housing, the end portions of the lifting jack piston rods being connected to stationary deck structure. Alternatively, the jack cylinders can be connected with the stationary structure and the piston rods with the lock housing.

Preferably, all fluid jack means of the device are hydraulically activated means. The possibility also exists that in the housing the jack cylinder is connected with the jaw means and the jack piston rod is connected with the housing proper.

In accordance with a further aspect of the invention, there is provided a vessel structure, such as an offshore platform structure, an anchor locating/retrieving ship, a tug boat, or the like, having a deck structure, at least one winch means for collecting/paying out a cable from/to outside the vessel, respectively, guiding means for the cable when entering/leaving the vessel, a cylindrical well arranged substantially vertically in the deck structure between the guide means and the winch means and having a top opening in the deck surface, an oblong cylindrical housing having a substantially open top and arranged displaceably in vertical direction in the well in the deck, a fluid activated jack having a cylinder and a piston rod arranged axially in the housing, the jack cylinder being rigidly connected with the housing wall, the jack piston rod being connected with a jaw means having a pair of jaws to close about and secure a cable, chain, or the like, said jaws projecting over the top of the housing, guiding means arranged on the housing and having cam means to cause the jaws to move towards/from one another when the jack is activated to extend/retract the piston rod, and fluid activated lifting jack means connected between the jaw housing and the vessel deck structure to lift the housing upwardly in the deck well when activated to bring the jaw means over the deck surface into the path of the cable and to retract the jaw means and the housing into the well in the deck structure under the deck surface level when the lifting jack means is activated in the opposite sense.

BRIEF DESCRIPTION OF THE DRAWINGS

Referring to FIGS. 1, 2 and 6 a portion of the after deck of a working ship is indicated by 1. A vertical cylindrical well 2 is provided in the deck structure. The well is located in the longitudinal medial plane of the ship and ahead of the after guide pins or an open hawse for a pendant wire extending therethrough (see FIG. 6). Below the well 2 at a distance from the boat deck 1 a support plate 3 is secured to the deck by supporting rods 4. The plate 3 can of course be secured to the deck in any other suitable way, or provide a part of the deck structure proper. The supporting plate 3 carries on its upper side a couple of fixing brackets 5 with pivot shafts 6.

Figure 1:
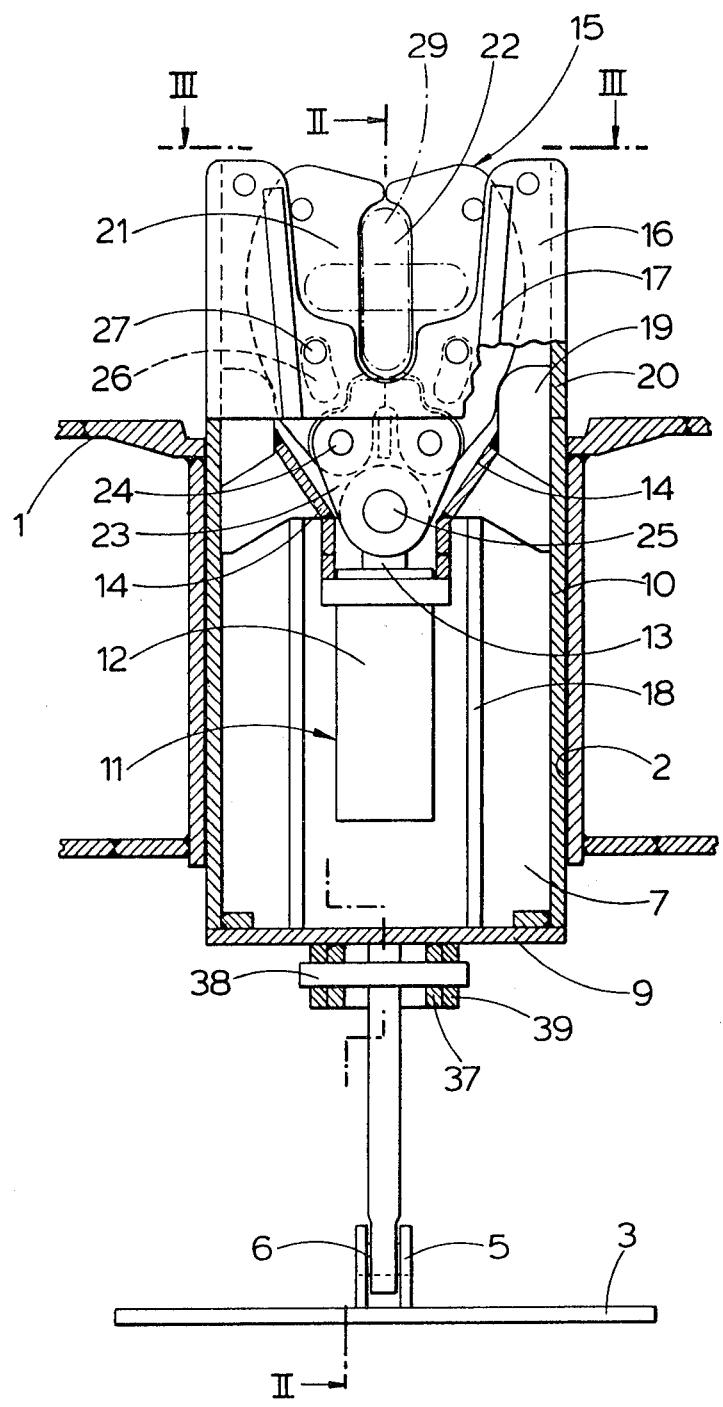
FIG. 1 is a vertical cross-sectional view of a device according to this invention arranged in the after deck of a working ship the section extending in a transversal plane of the ship.

In the well 2 in the deck structure 1 a cylindrical housing 7 is located displaceably in vertical direction. The housing has an apertured top wall 8 and an apertured bottom wall 9. The peripheral or side wall of the housing is indicated by 10. Centrally in the cylindrical housing 7 a hydraulic jack 11 is located with a cylinder 12 and a piston rod 13. In the upper portion of the housing 7 and in the diametral plane of the cylindrical a bracket means 14 is located providing a support for the jack cylinder 12, as it can be seen in FIG. 1. The bracket means 14 has a mid portion which is widened upwardly to accommodate a jaw means 15 of the device which will be disclosed more closely in the following. As it appears from FIG. 2 the bracket 14 has two side plates 16 extending in parallel and transversally to the main plane of the bracket 14, i. e. in the transversal direction of the boat. The plates 16 are fixedly connected by welding with the top wall 8 of the locking jaw housing 7 and they are additionally stiffened by means of corner plates 17 so that the support bracket along with the top portion of the housing 7 provides a very rigid structural unit. The side plates 16 extend a substantial distance over the jaw housing top 8.

In the cylindrical housing 7 and in the plane of and aligned with the corner plates 17 two diametrally opposed plates 18 are provided extending from the bottom wall 9 and connected with the outer sides of the side plates 16 and the under side of the top wall 8. The plates 18 serve to stiffen the cylindrical housing 7 to provide a still more rigid structural unit.

Between the side plates 16 two guide members 19 are provided rigidly secured to the upwardly widened portion of the bracket 14. Each guide member has a rounded cam portion facing the center axis of the device and having a suitable cam profile for guiding and closing the jaws 21 of the locking jaw means 15. These guide members or cam portions 19 are supported by extended portions 20 of the housing wall 10 and are welded to it and to the top wall 8 to provide a very rigid structure.

Figure 2:
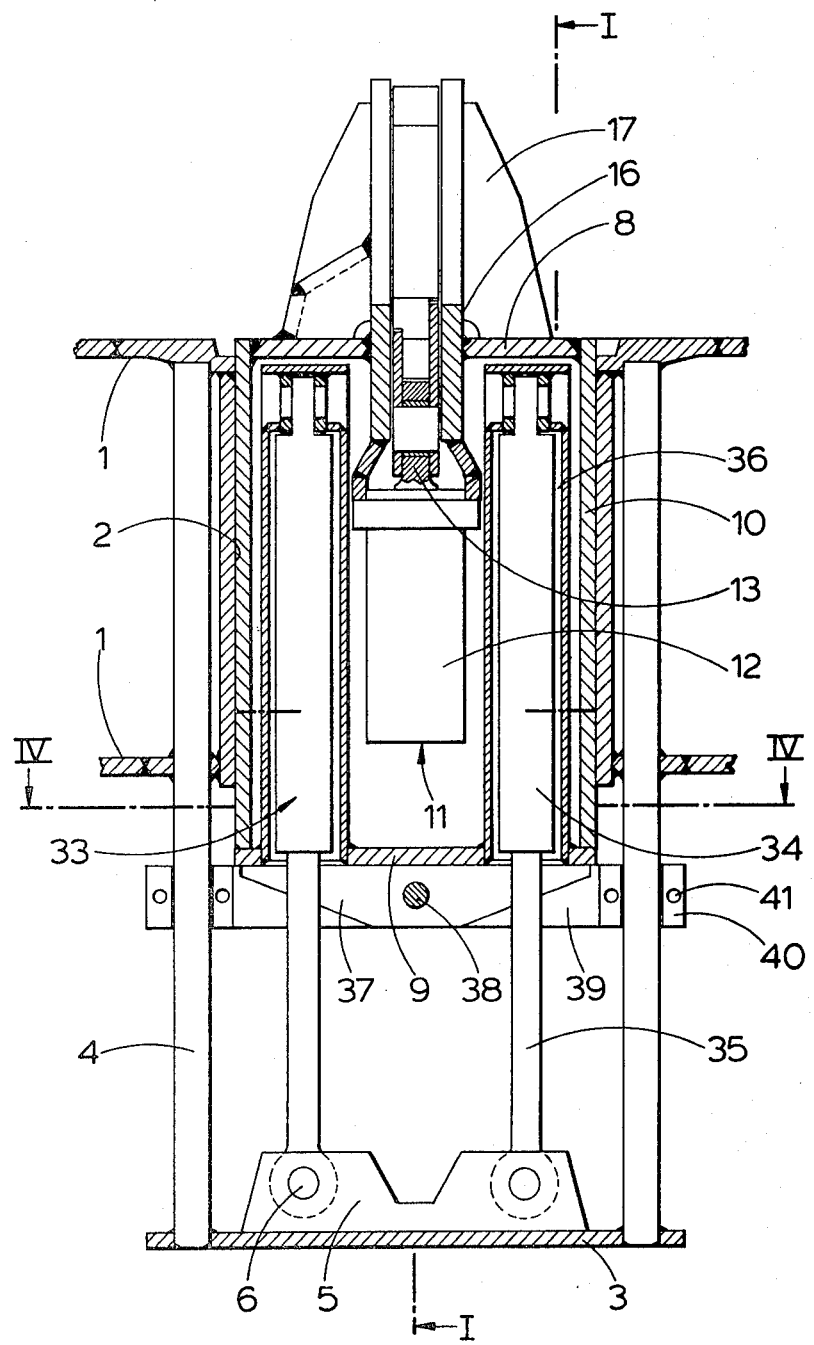
FIG. 2 is a corresponding cross-sectional view taken in a longitudinal plane of the ship.
Figure 3:
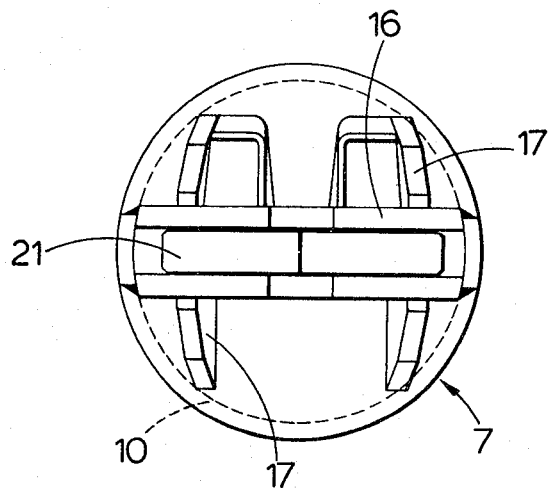
FIG. 3 is a plan view of the lock jaw cylinder with the jaws.
Figure 5:
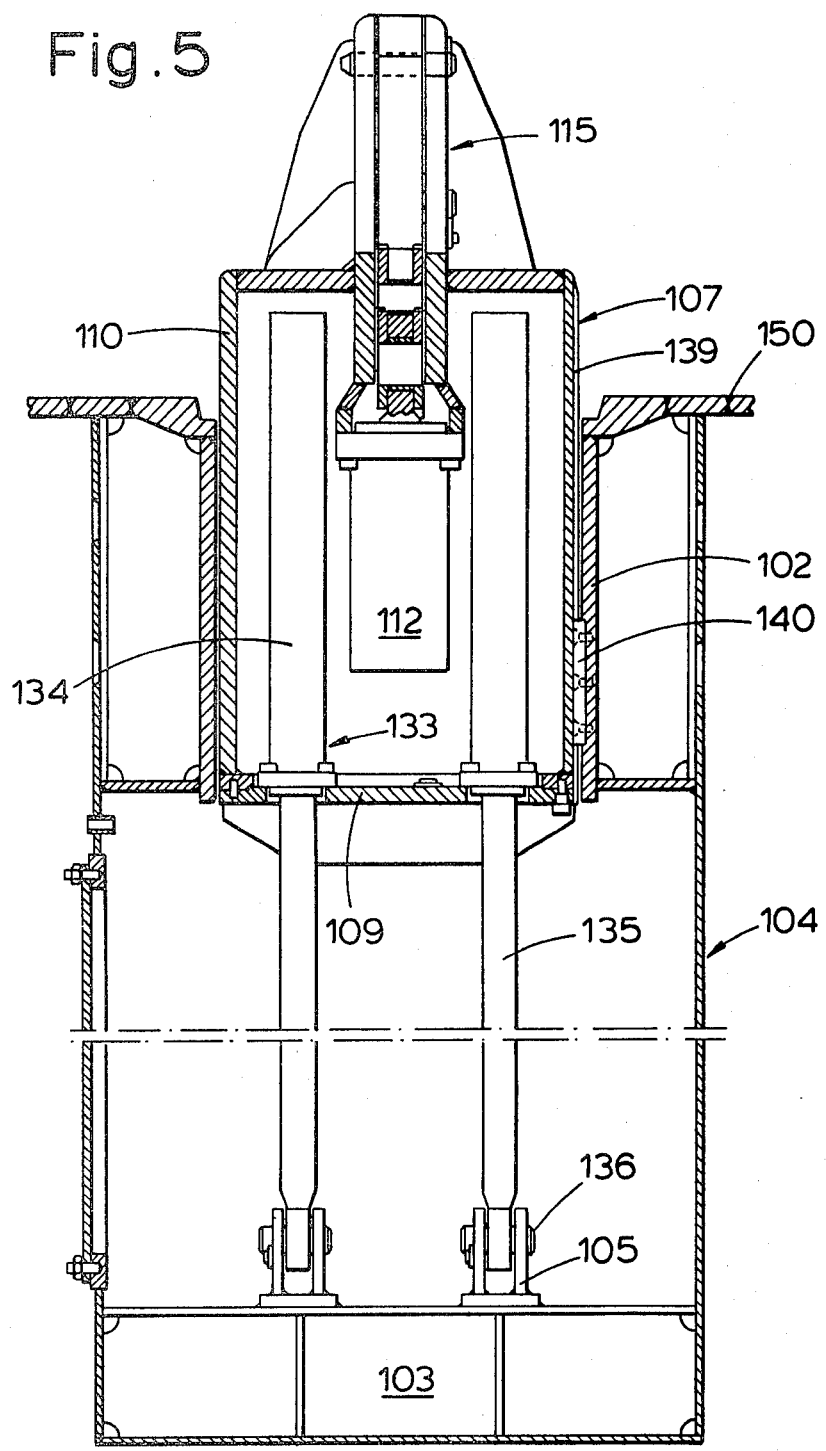
FIG. 5 corresponds to FIG. 2 and shows an for the time being more preferred embodiment.

The lock jaw means 15 comprises a pair of cooperating jaws 21 which according to FIG. 1 when in closed position provide between themselves an opening 22 corresponding to the contour of an anchor chain link. The jaws 21 are exchangeable so that jaws suitably shaped e.g. for a wire can also be mounted. The symmetrically arranged jaws 21 are at their lower ends pivotably connected to a substantially triangle-shaped support 23 provided with spacingly arranged pivots 24 for supporting the jaws 21 and also provided with a lower pivot 25 for connecting the support 23 to the piston rod 13 of the jaw 11. The lower portions of the jaws 21 are shaped with obliquely upwardly and outwardly extending slots 26 for guiding pins 27 which are secured in one or two side plates which can be the above mentioned side plates 16. The outwardly facing outline of the jaws 21 is so shaped that the jaws are forced towards one another by the cams 19 when the locking jaw means is moved downwardly. To the contrary, the guide pins 27 force the jaws to move from one another when the piston rod 13 is lifting the jaw means 15 upwardly. The top portion of the support 23 is adapted to support a chain or wire, respectively, when the jaws are in open position. FIGS. 2 and 5 show the locking jaw means of the device located over the level of the ship deck 1 and the jaws are closed about a chain link 29 so securing the chain safely to the deck of the vessel. Also the transversal link of the chain is indicated in FIG. 1. When the chain has to be released the jack 11 is actuated for extending the piston rod 13 to open the jaw pair 12.

Figure 4:
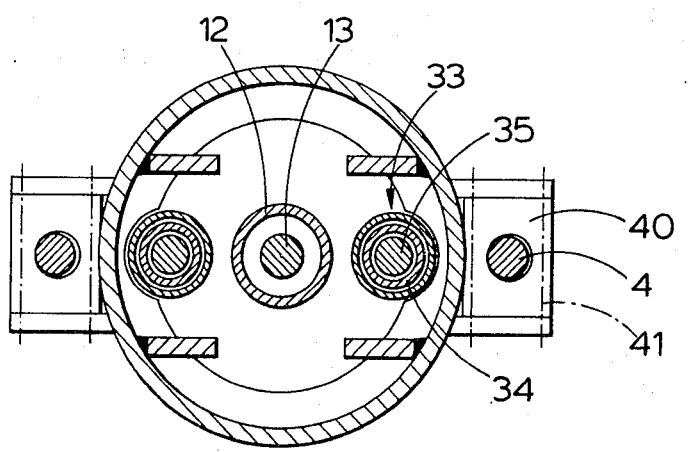
FIG. 4 shows a cross-sectional view taken along line IV—IV in FIG. 2.

As it appears from FIGS. 2 and 4, in a common diametral plane and on either side of the jack 11 there are arranged in the cylindrical jaw housing 7 two hydraulic lifting jacks 33 each having a cylinder 34 and a piston rod 35. Two diametrically located cylinder box-shaped brackets 36 are extending upwardly from the bottom wall 9 of the housing 7 and reach nearly the top wall 8 of the cylinder 7. In the upper end portions of the brackets 36 the cylinders 34 of the jacks 33 are suspended pivotably with their piston rods 35 extending downwardly and linkably connected with the base plate brackets 5 by means of the pivots 6.

Under the bottom 9 of the housing 7 two reinforcing ribs 37 are secured and connected with a yoke by means of a bolt 38. The yoke consists of two rail members 39. Two guides 40 are secured between the end portions of the yoke members 39 by means of thread bolts 41. The guides 40 are sliding on the support rods 4 when the housing 7 is lifted or lowered. When the two bolts 6 and the bolt 38 are removed the housing with the jack 11 and the jaw means 15 can be lifted from the well 2 for repair or servicing. The assembly 37–41 prevents the housing 7 from rotation due to unsymmetrical load from a chain on the jaw means.

It appears from the drawings that the jacks 11,33 and the rods 4 are located in the longitudinal medial plane of the boat, but they can be arranged in any other suitable substantially vertical plane of the ship.

FIG. 5 corresponds to FIG. 2 and shows an embodiment preferred for the present time. Instead of the support rods 4 of FIG. 2 a box structure 104 is provided having a bottom wall 103 carrying the brackets 105 which are pivotably connected (at 106) to the piston rods 135 of the jacks 133 for lifting/lowering the jaw housing 107 which is located in a well 102 arranged in the ship deck.

The jaw mechanisms 115 with the jaw opening jack is rather identical with that of FIGS. 1 and 2. The cylinders 134 of the lifting jacks 133 are at their lower ends secured to the bottom wall 109 of the housing 7, thus providing a more simpel and less expensive construction.

The guides 40 of FIG. 2 are superfluous in this embodiment. In case of a cylindrical housing 107 and cylindrical well 102 there is provided at least one radial groove 139 extending longitudinally outside in the peripheral wall 110 of the housing. On the inner side of the wall of the well 102 a corresponding guide wedge 140 is provided. The members 139 and 140 have the function of the members 4,40 in FIG. 2, i.e. to prevent turning of the housing 107 about the central axis of the well 102.

The embodiment of FIG. 5 has a cylindrical well and a cylindrical housing, but FIG. 5 may be considered to represent a vertical-sectional view of an arrangement fitted with well and housing having square cross-sections. (The square has rounded corners.) Then, the groove 139 and the wedge 140 can be dispensed with. It should also be noted that the peripheral walls of the housing 7,107) and of the well 2,102 need not to be continued and can be provided with apertures, if desirable.

The device according to the invention can be produced as a ready-to-use assembly in the factory for mounting by welding in the deck structure of a boat. The welding seam is indicated at 150 in FIG. 5.

Figure 6:
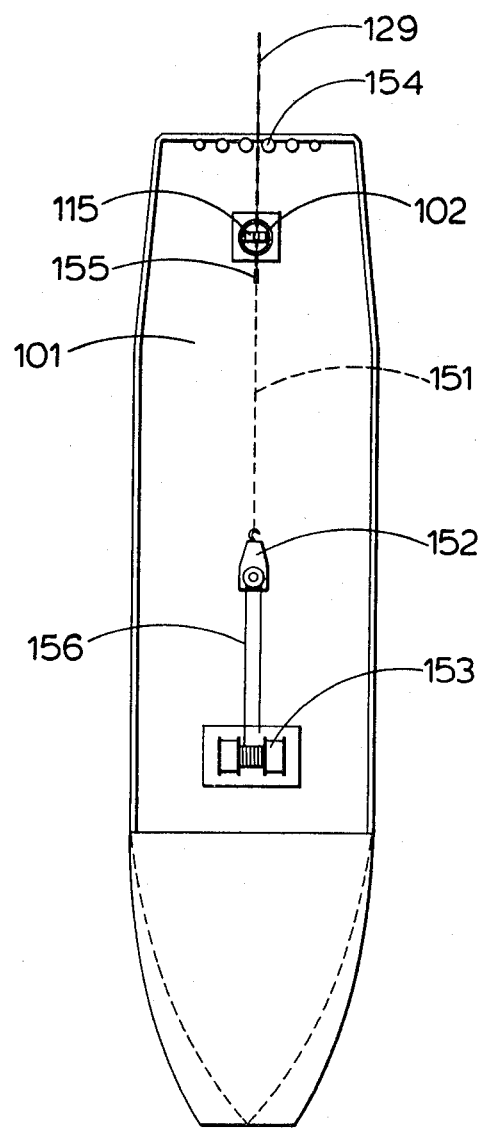
FIG. 6 is a plan view of a ship outfitted with a device of the invention disposed in the deck structure of the ship.

In FIG. 6 a plan view of a ship is shown having an after deck portion 101 wherein a device according to the invention is mounted. The deck well is designed 102 and the tow means 115. An anchor chain 129 extends between guide pins 154 at the after end of the ship deck passing the jaw means 15 on its path toward a cable winch 153. A wire 155 is connected to the chain by a shackel 155 and the opposite end of the wire is connected to a sheave block 152 of the winch cable 156.

As already mentioned FIGS. 1, 2 and 5 show the device in the operative position. When the device is to be taken out of operation, the lifting jacks 33,133 are acted upon by fluid pressure to retract the piston rods 35,135, the lifting cylinders 34,134, the entire housing 7,107 moving downwardly until the housing and the jaw means 15,115 are located beneath the top plane of the ship deck 1,101. The well 2,102 can so be covered by a lid which is not shown. The lifting and lowering movement is controlled by control valves (not shown) securing the supply or shut-off of the pressure fluid to the jack cylinders.

When the device is used for securing a wire normally a shackle, a "Talurit" lock, a grommet or another connecting member will abut the jaws of the jaw means in the same manner as a transversal link of a chain.

Again, when the device shall be taken in use e.g. to secure an pendant wire, the jaw housing is lifted up from the well with the jaws open (piston rod 13 extended) so that the wire can be placed between the jaws whereupon the jaws are closed about the wire by retracting the piston rod of the jack 11,111. At the same time the lifting jacks 33,133 are adjusted so that the jaw means 15,115 is maintained at a correct level in relation to the wire. The control is carried out manually, but it can also be performed automatically. The same procedure is followed when securing or locking a chain.

The drawings show an embodiment with the jacks for lifting/lowering the jaw housing provided in the housing itself. In this way a rigid, compact unit having small mounting depth has been provided. However, the possibility also exists for arranging the cylinders outside the jaw housing e.g. between the bottom wall 109 of the housing 107 and the base plate structure 103, but such solution seems less practicable because of the space and additional reinforcements needed.

I claim:

1. A cable locking device for locking a cable, chain, wire or tow particularly but not exclusively for securing an anchor chain and/or pendant wire to an offshore vessel, said device comprising an oblong, substantially cylindrical, lock housing in which there is arranged substantially co-axially a fluid activated jack means with a jack cylinder and a jack piston rod thereof being operationally connected between the housing and a locking jaw means having a pair of locking jaws adapted for moving from one another and towards one another by said fluid activated jack means to allow introducing between the jaw means a cable or the like when the jaw means is in open position and to provide an opening corresponding to the contour of the cable, chain or the like, said opening being large enough for the general diameter of said cable, chain or the like to pass through when the jaw means is closed but capable of arresting said cable, chain or the like at points where its diameter is increased sufficiently from said general diameter, the lock housing being adapted to be withdrawn retractably by additional jack cylinder means into a correspondingly shaped cylindrical well in a stationary deck structure of an offshore vessel.

2. A device according to claim 1, characterized in that in the lock jaw housing there are arranged two radial guide ribs extending in the longitudinal direction of the lock housing and projecting inwardly from the housing wall, the end portions of ribs on the jaw side being shaped as cams which when the piston rod is retracted force the jaws inwardly towards one another for arresting a cable, chain, wire, or the like which is positioned between the jaws.

3. A device according to claim 1, characterized in that the jaws are pivotably secured between guide plates having means forcing the jaws to move from one another when the jack piston rod is extended.

4. A device according to claim 1, characterized in that the fluid jack means are hydraulically activated means.

5. A cable locking device for locking a cable, chain, wire or tow particularly but not exclusively for securing an anchor chain or/and pendant wire to an offshore vessel, characterized in that the device comprises an oblong lock housing in which there is arranged a fluid activated jack means, the jack cylinder being rigidly connected with the housing and the jack piston rod being operationally connected with a locking jaw means having a pair of locking jaws adapted for moving against/from one another by retracting/extending the piston rod into/from the jack cylinder, respectively, the housing being adapted to be arranged extendable/retractable in a correspondingly shaped well in a stationary structure, and characterized in that in the lock housing at least two lifting fluid activated jacks are positioned one on either side of the jaw jack means, the cylinders of said two lifting jacks being connected with the lock housing, the end portions of the lifting jack piston rods being adapted for coupling to the stationary structure.

6. A vessel structure, such as an offshore platform structure, an anchor locating/retrieving ship, a tug boat, or the like, having a deck structure, at least one winch means for collecting/paying out a cable from/to outside the vessel, respectively, guiding means for the cable when entering/leaving the vessel, a cylindrical well arranged substantially vertically in the deck structure between the guide means and the winch means and having a top opening in the deck surface, an oblong cylindrical housing having a substantially open top and arranged displaceably in vertical direction in the well in the deck, a fluid activated jack having a cylinder and a piston rod arranged axially in the housing, the jack cylinder being rigidly connected with the housing wall, the jack piston rod being connected with a jaw means having a pair of jaws to close about and secure a cable, chain, or the like, said jaws projecting over the top of the housing, guiding means arranged in/on the housing and having means to cause the jaws to move towards/from one another when the jack is activated to extend/retract the piston rod, and fluid activated lifting jack means connected between the jaw housing and the vessel deck structure to lift the housing upwardly in the deck well when activated to bring the jaw means over the deck surface into the path of the cable and to retract the jaw means and the housing into the well in the deck structure under the deck surface level when the lifting jack means is activated in the opposite sense.

7. A cable locking device for locking a cable, chain, wire or tow particularly but not exclusively for securing an anchor chain or/and pendant wire to an offshore vessel, characterized in that the device comprises an oblong lock housing in which there is arranged a fluid activated jack means, the jack cylinder being rigidly connected with the housing and the jack piston rod being operationally connected with a locking jaw means having a pair of locking jaws adapted for moving against/from one another by retracting/extending the piston rod into/from the jack cylinder, respectively, the housing being adapted to be arranged extendable/retractable in a correspondingly shaped well in a stationary structure, and characterized in that in the lock housing a fluid activated jack lifting means is provided with jack cylinder(s) connected with the stationary structure and the piston rod(s) connected with the lock housing.

* * * * *